C. B. MILLS.
STARTING MECHANISM FOR MOTOR VEHICLES.
APPLICATION FILED JUNE 9, 1914.

1,248,524. Patented Dec. 4, 1917.

2 SHEETS—SHEET 1.

WITNESSES:
P. J. Ridge.
J. R. Langley.

INVENTOR
Chester B. Mills.
BY
Wesley G. Carr
ATTORNEY

UNITED STATES PATENT OFFICE.

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

STARTING MECHANISM FOR MOTOR-VEHICLES.

1,248,524. Specification of Letters Patent. Patented Dec. 4, 1917.

Application filed June 9, 1914. Serial No. 843,965.

*To all whom it may concern:*

Be it known that I, CHESTER B. MILLS, a citizen of the United States, and a resident of East McKeesport, in the county of Allegheny and State of Pennsylvania, have invented a new and useful Improvement in Starting Mechanisms for Motor-Vehicles, of which the following is a specification.

My invention relates to starting mechanisms for motor vehicles and particularly to such mechanisms as are adapted to be employed in connection with the internal combustion engines of cycle cars or other motor vehicles.

My invention has for its object to provide a mechanism of the character indicated above that is simple in construction and effective in operation to simultaneously control the transmission mechanism of a motor vehicle and the operative connection of a starting motor to an internal combustion engine.

In the operation of engine-driven motor vehicles, it is desirable that some means be employed to prevent the operative connection of the starting motor to the internal combustion engine when the transmission mechanism is connected to the engine. It is also desirable that the compression relief valves of the engine be open during such time as the starting motor is in operation in order that a large torque and a heavy current are not required.

I provide a mechanism in which the separate means for controlling the transmission mechanism and the operative connection of the starting motor to the engine are so interlocked that the motor cannot be connected to the engine unless the transmission mechanism is in its neutral position. The means for controlling the connection of the starting motor also serves to control the compression relief valves of the engine and the electrical connections of the starting motor.

Figure 1:
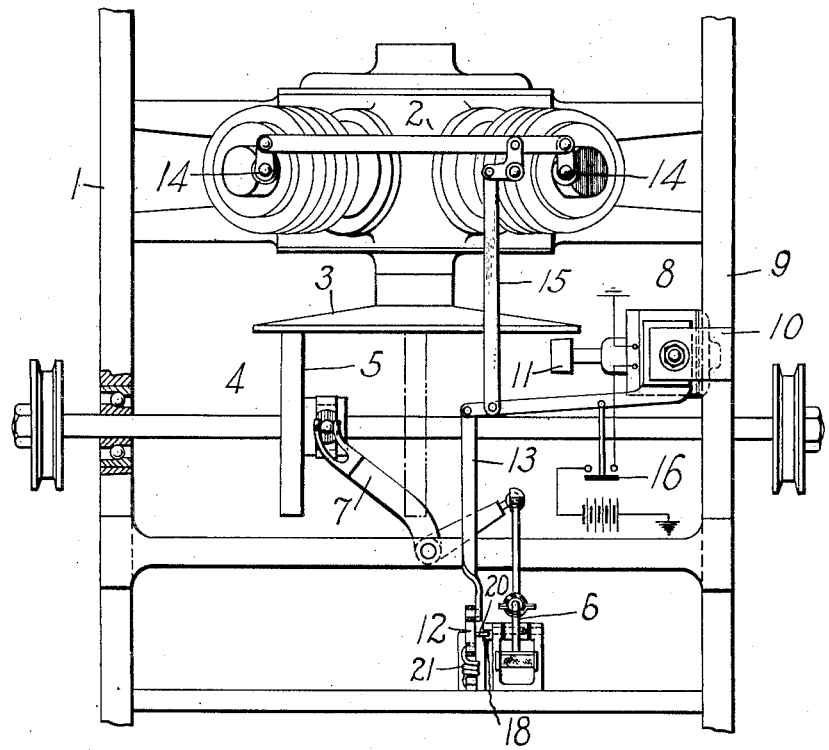
Figure 2:
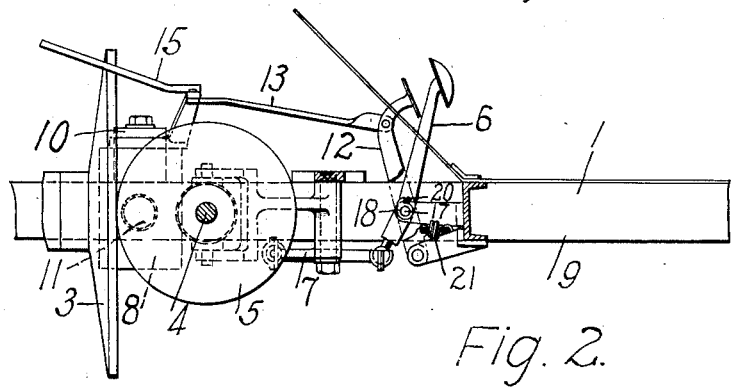
Figure 3:
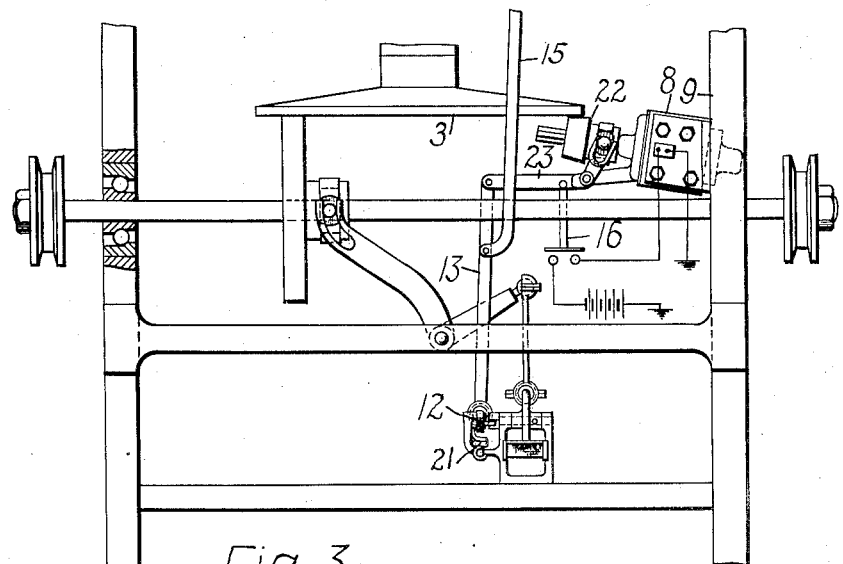
Figure 4:
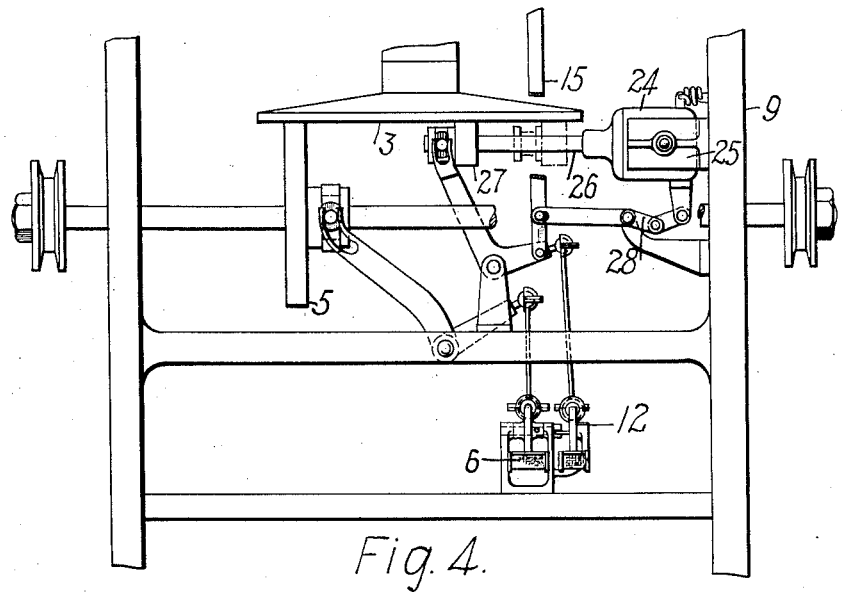
Figure 5:
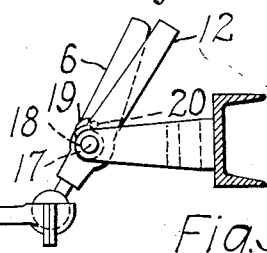

In the accompanying drawings, Figure 1 is a view, partially in plan and partially in section, of a portion of a cycle car embodying my invention. Fig. 2 is a view, in longitudinal section, of the mechanism shown in Fig. 1. Figs. 3 and 4 are views, similar to Fig. 1, of modifications. Fig. 5 is a detail view of the interlocking means.

Referring particularly to Figs. 1 and 2, a cycle car 1, only a portion of which is shown, is provided with an engine 2 having a friction disk 3 mounted on its shaft (not shown). A counter shaft 4, which may be connected in any suitable manner, to the driving wheels of the vehicle, is provided with a slidably mounted friction wheel 5 which coacts with the friction disk 3. A lever 6, which is connected to the wheel 5 by a linkage mechanism 7, actuates the wheel 5 along the shaft 4 to vary the speed ratio between the engine shaft and the shaft 4. In the central or neutral position of the wheel 5, as indicated by dot and dash lines, the wheel 5 is not rotated by the disk 3.

A starting motor 8, which is pivotally mounted upon the frame 9 by means of suitable brackets 10, is provided with a friction wheel 11 that is adapted to engage the disk 3. A lever 12, which is connected to the motor 8 by means of a linkage mechanism 13 and to the compression relief valves 14 of the engine 2 by a link 15, operates to effect the engagement of the wheel 11 with the disk 3 and to open the relief valves 14. A switch 16, which controls the circuit of the motor 8, is also closed at the end of these operations. As shown in detail in Fig. 5, the lever 6 is fixed upon a shaft 17 that is provided with a lug 18 having a shoulder portion 19. The lever 12 is provided with a pin 20 which projects into the path of movement of the lug 18. When the wheel 5 is in any position other than its neutral position, the lug 18 will obstruct the movement of the pin 20 so that the lever 12 cannot be actuated to effect the connection of the starting motor to the engine without, at the same time, actuating the lever 6 to move the wheel 5 to its neutral position. When the lever 12 is in its inoperative position, the lever 6 may be freely moved to control the speed ratio between the engine and the driving mechanism by shifting the wheel 5 along the shaft 4.

In the operation of the mechanism, the wheel 5 is first brought to its neutral position. The lever 12 is then pushed forwardly to simultaneously rock the motor 8 about its pivot to effect the engagement of the pinion 11 with the disk 3 and to open the compression relief valves 14 and thereupon close the switch 16. The motor then operates at a comparatively high speed to start the engine. When the engine starts under its own power, the operator permits the lever 12 to be retracted to its inoperative position by a spring 21 and thus effect the disengagement of the pinion 11 and the friction disk 3, the opening of the switch 16 and the closing of the valves 14.

A modification of the mechanism of Fig. 1 is illustrated in Fig. 3 in which like numerals are employed to designate corresponding parts. In this view, the engine 2 has been omitted as unnecessary. The motor 8 is fixed to the frame 9 in any suitable manner, with the axis of its shaft inclined to the plane of the disk 3, and is provided with a beveled friction wheel 22 which is slidable upon the motor shaft. The wheel 22 is controlled by a pivotally mounted lever 23 that is connected to the lever 12 by the link 13. The construction of the modification differs materially in no other respect from that of the mechanism shown in Fig. 1. The actuation of the lever 12 operates to simultaneously effect engagement of the wheel 22 and the friction disk 3, open the compression relief valves 14, and close the switch 16 to thus complete the motor circuit.

A second modification is illustrated in Fig. 4 in which like numerals are employed to designate corresponding parts. A dynamo-electric machine 24, which is adapted to operate either as a motor or as a generator, is pivotally mounted upon the frame 9 by means of a bracket 25. The armature shaft 26 of the dynamo-electric machine 24 is provided with a pinion 27 that is slidably mounted thereon and is adapted to engage the disk 3 at two points during its path of movement along the armature shaft 26. The position of the dynamo-electric machine 24 relatively to its point of support is controlled by a lever mechanism 28 which is, in effect, a toggle and which operates to produce a rocking movement of the dynamo-electric machine 24 in opposite directions during a continuous movement of the toggle 28. The toggle mechanism 28 is connected to the link 15 which is, in turn, connected to the lever 12.

When it is desired to start the engine, the operator will first actuate the lever 6 to bring the friction wheel 5 to its neutral position, if the latter is not already in this position. Normally, the dynamo-electric machine 24 and the friction wheel 27 occupy the positions shown in full lines in the drawing. The lever 12 is then actuated to simultaneously rock the dynamo-electric machine about its pivot, shift the friction wheel 27 along the armature shaft 26 to the position indicated by dotted lines and open the compression relief valves 14. During the movement of the pinion 27 along the shaft 26, the toggle mechanism 28 has rocked the dynamo-electric machine 24 about its pivot in such a manner that the wheel 27 does not engage the disk 3 except at the ends of its path of movement. The circuit of the dynamo-electric machine 24 is then closed by any suitable means (not shown), and the machine operates as a motor, at a comparatively high speed ratio, to start the engine 2. When the engine starts under its own power, the operator releases the lever 12 which is then retracted by the spring 21 to simultaneously close the compression relief valves 14, shift the friction wheel 27 from its position indicated by dotted lines to that indicated by full lines and rock the dynamo-electric machine 24 about its pivot. The dynamo-electric machine, when operated as a generator is driven, at a relatively low speed ratio, to furnish current for the purpose of charging the battery or supplying lighting and ignition circuits, as desired.

It will be noted that I provide a mechanism which prevents the operative connections of the starting motor to the engine shaft of an automobile when the latter is connected to the transmission mechanism. I provide also a simple and convenient means for simultaneously opening the compression relief valves, effecting the operative connection of the motor to the engine and controlling the circuit of the motor.

I claim as my invention:

1. In a starting system, the combination with an engine shaft, a friction disk mounted thereon, and a coacting friction wheel movable relatively thereto, of a motor pivotally mounted for movement into and out of operative connection with said disk, and means for simultaneously shifting said wheel and said motor.

2. In a starting system, the combination with an engine shaft, a wheel mounted thereon, and a coacting wheel shiftable relatively thereto, of a starting motor, means for operatively connecting said motor to one of said wheels, means for controlling said connecting means, means for actuating said shiftable wheel, and means for preventing the operative connection of said motor to one of said wheels except when the wheels are in relatively inoperative positions.

3. In a starting system, the combination with an engine shaft, a wheel mounted thereon, and a coacting wheel shiftable relatively thereto, of a starting motor, means for operatively connecting said motor to one of said wheels, means for controlling said connecting means, means for actuating the shiftable wheel, and means for preventing the operation of said controlling means except when the actuating means is in a predetermined position.

4. In a starting system, the combination with an engine shaft, a wheel mounted thereon, and a coacting wheel shiftable relatively thereto, of a starting motor, means for operatively connecting said motor to one of said wheels, means for controlling said connecting means comprising a lever, a lever for actuating said shiftable wheel, and means for insuring that the actuating lever is in a predetermined position when the controlling lever is operated.

5. In a starting system, the combination with an engine shaft, a friction disk mounted thereon, and a coacting friction wheel movable relatively thereto for controlling the speed ratios between them, of a starting motor pivotally mounted and provided with means for engaging said disk, and means for simultaneously shifting said wheel to an inoperative position and said motor into operative connection to said disk and for controlling the supply of energy to said motor.

6. In a starting system, the combination with an engine shaft, a friction disk mounted thereon, and a coacting friction wheel movable relatively thereto, of a motor pivotally mounted for movement into and out of operative connection with said disk.

In testimony whereof I have hereunto subscribed my name this 29th day of May, 1914.

CHESTER B. MILLS.

Witnesses:
  CHAS. N. PALMER,
  B. B. HINES.